United States Patent

Fauth

[15] 3,672,692
[45] June 27, 1972

[54] QUICK-CHANGE CHUCKS

[72] Inventor: Otto Fauth, Nellingen, Germany

[73] Assignee: Otto Bilz, Werkzeugfabrik, Vogelsangstr., Nellingen, Germany

[22] Filed: May 18, 1970

[21] Appl. No.: 38,080

[52] U.S. Cl. .............................................. 279/82, 279/1 B
[51] Int. Cl. ........................................................ B23b 31/04
[58] Field of Search .......................... 279/1 B, 82, 81, 83, 75

[56] References Cited

UNITED STATES PATENTS

| | | | |
|---|---|---|---|
| 3,473,815 | 10/1969 | Bilz | 279/82 |
| 2,960,343 | 11/1960 | Elledge | 279/81 |
| 3,070,380 | 12/1962 | Holmberg | 279/75 X |
| 3,219,355 | 11/1965 | Fujinuma | 279/75 |

*Primary Examiner*—Andrew R. Juhasz
*Assistant Examiner*—Z. R. Bilinsky
*Attorney*—Craig, Antonelli and Hill

[57] ABSTRACT

A quick-change chuck with a hollow shank, a guide sleeve surrounding the shank, a tool-holding socket removably inserted into the shank and adapted to be adjusted to different positions in the axial direction of the shank by an adjusting nut on the end of the socket which is releasably connected in the adjusted position to the shank by locking balls which are guided in transverse bores in a reduced neck portion of the guide sleeve and are adapted to be moved into and out of an annular groove in the adjusting unit by a spring-biased control sleeve. For locking the guide sleeve and thus also the adjusting nut and the tool socket to the shank, the guide sleeve is provided with a peripherally extending slot through which a setscrew passes which is screwed into the shank. The axis of this slot is slightly inclined relative to a plane extending vertically to the axis of the guide sleeve so that, when the sleeve is turned relative to the setscrew in the slot, the sleeve is retracted on the shank until its neck portion abuts tightly against the front end of the shank.

4 Claims, 2 Drawing Figures

PATENTED JUN 27 1972  3,672,692
FIG.1
FIG.2
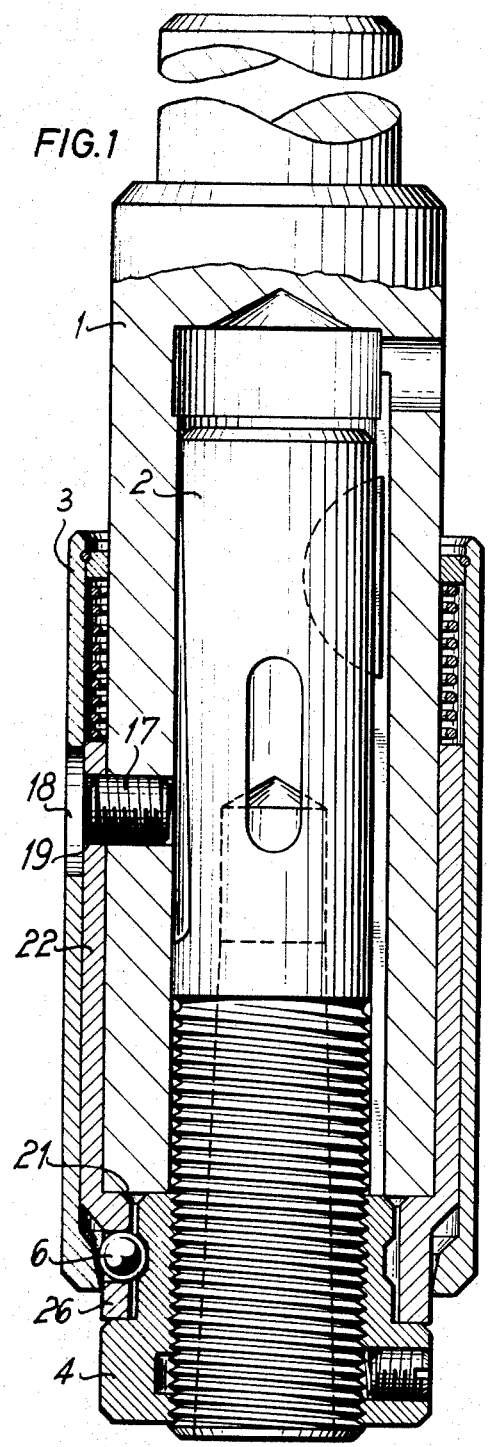
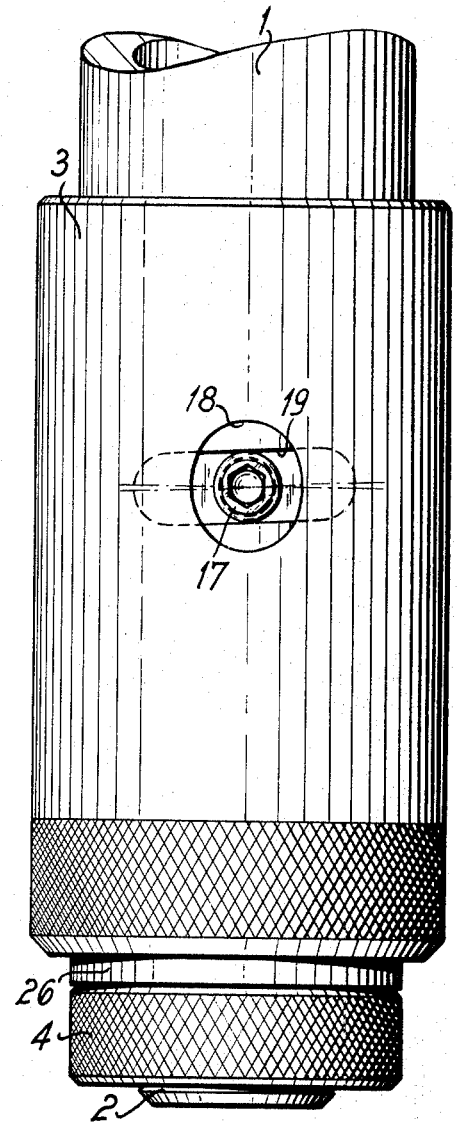
INVENTOR:
Otto FAUTH
By Craig, Antonelli, Stewart & Hill
ATTORNEYS

QUICK-CHANGE CHUCKS

The present invention relates to improvements in a quick-change chuck of the type as disclosed in my U.S. Pat. No. 3,473,815, which comprises a hollow cylindrical shank, a tool socket which is axially slidable within the shank and adapted to receive a tool, an adjusting nut which is adapted to be screwed upon the front end of the socket for shifting the socket in its axial direction relative to the shank. This adjusting nut has a cylindrical neck portion and a peripheral groove within this neck portion which groove is provided with two outwardly inclined flanks. By the action of a spring-biased control sleeve, which is axially movable on the shank, a plurality of locking balls are movable substantially radially into and out of the groove, while a guide sleeve which is fitted over the shank and, in turn, surrounded by the control sleeve has on its front end an annular neck of a smaller diameter. This neck which forms an inner shoulder which is adapted to abut against the front end of the shank is provided with transverse bores for guiding the locking balls. Near its rear end the guide sleeve is locked to the shank by means of a setscrew which is inserted through a transverse bore in this sleeve and screwed into a tapped bore in the shank.

It is an object of the present invention to improve the quick-change chuck as disclosed in my previous patent and as briefly described above by designing the transverse bore in the guide sleeve through which the setscrew is inserted so as to form a slot-shaped hole which extends in the peripheral direction of the sleeve and the longitudinal axis of which is slightly inclined to a plane extending vertically to the longitudinal axis of the sleeve. If desired, it is also possible to provide two or more similar inclined slot-shaped holes which are slightly offset to each other in the longitudinal direction of the sleeve and into one or the other of which the setscrew may be inserted. The aperture in the outer control sleeve through which the setscrew is accessible is sufficiently enlarged to permit the guide sleeve to be turned, and if several slot-shaped holes are provided in the guide sleeve, the control sleeve may be provided with several enlarged apertures which are likewise longitudinally offset relative to each other in accordance with the slot-shaped holes in the guide sleeve.

If according to my previous patent the smooth circular bore in the guide sleeve was made of the same diameter as the setscrew, the occurrence of a slight tolerance from the prescribed positions of this bore and of the threaded bore in the shank either prevented the setscrew entirely from being screwed into the shank or the shoulder on the neck of the guide sleeve from tightly abutting against the front end of the shank with the result that the adjusting nut together with the tool socket was movable in the axial direction relative to the shank. This last result also occurred if, in order to compensate for such possible tolerances, the bore in the guide sleeve as made of a larger diameter than the setscrew.

If in accordance with the present invention the guide sleeve is provided with a slightly inclined, peripherally extending slot in place of a circular bore, the guide sleeve when being turned about its axis relative to the setscrew will also be retracted longitudinally along the shank until the shoulder on the neck of the guide sleeve will abut tightly against the surface of the front end of the shank. The present invention therefore permits the guide sleeve to be securely locked to the shank even if the position of the threaded bore in the shank differs slightly from its prescribed position. This is of importance especially also in a case in which the guide sleeve is to be mounted on a similar, already existing shank which is provided with a threaded bore for a setscrew in a position which differs slightly from the position as required for mounting a guide sleeve thereon which is made in accordance with the invention.

Since the inclination of the slot in the guide sleeve is very small, a self-locking friction occurs between the setscrew and one wall of the slot when the shoulder on the guide sleeve abuts against the end of the shank. Thus, there are no additional means required for preventing the guide sleeve from turning back and shifting to a position in which the neck of the guide sleeve does not tightly abut against the front end of the shank.

The feature of the invention will become more clearly apparent from the following detailed description thereof which is to be read with reference to the accompanying drawings, in which FIG. 1 shows a longitudinal section of a quick-change chuck according to the invention; while FIG. 2 shows a plan view of the lower part of the chuck according to FIG. 1.

The quick-change chuck according to the invention is of the same general construction as the chuck which has been described in detail in my prior patent as above referred to and which comprises a hollow cylindrical shank or housing 1 into which an adjustable tool-holding socket 2 may be inserted upon the threaded front end of which an adjusting nut 4 is screwed. A guide or locking sleeve 22 which is slipped over the shank 1 has a front end in the form of a neck portion 26 of a smaller diameter which engages upon the end surface 21 of the shank 1 and is provided with radial bores in which locking balls 6 are radially slidable which are adapted to engage into an annular groove in the adjusting nut 4 when a guide sleeve 22 is retracted by a spring so that a tapered surface on an inwardly projecting annular flange on the front end of this guide sleeve which surrounds the neck portion 26 of sleeve 22 presses the balls into the annular groove of the adjusting nut. When the control sleeve is shifted forwardly along the guide sleeve against the action of the spring, the locking balls 6 may move radially toward the outside and out of the peripheral groove in the adjusting nut 4 so that the tool socket 2 with the adjusting nut 4 thereon may then be withdrawn from the shank 1.

Near its rear end, guide sleeve 22 is locked to the shank 1 by a setscrew 17 which is inserted through a transverse aperture 19 in guide sleeve 22 and screwed into the shank 1. If, as shown in the drawings, the control sleeve 3 projects toward the rear beyond the setscrew 17, this sleeve 3 is provided with an aperture 18 through which the setscrew 18 may be inserted and turned by a screw driver.

While according to my prior patent the transverse aperture 19 in guide sleeve 22 through which the setscrew 17 is inserted consists of a smooth circular bore, the present invention provides that, for locking the guide sleeve 22 to the shank 1 so as to prevent any movement of these two elements relative to each other in the axial direction, the aperture 19 in guide sleeve 22 is provided in the form of a slot-shaped hole which extends in the peripheral direction of sleeve 22 and the longitudinal axis of which is slightly inclined to a plane which extends vertically to the longitudinal axis of this sleeve. If guide sleeve 22 is turned in one direction about its axis relative to shank 1, the inclination of the walls of the slot-shaped hole 19 causes the guide sleeve 22 to be shifted slightly toward the rear so that its neck portion 26 will be pressed tightly against the front-end surface of shank 1. Since this inclination of the walls of the slot-shaped hole 19 is very small, a self-locking friction will then occur between one side wall of this hole and the setscrew 17 which insures that guide sleeve 22 will remain in the locked position in which the neck portion 26 abuts tightly against the end surface of shank 1.

If the positions of the threaded bores for the setscrew 17 of different shanks 1 differ considerably from each other in the longitudinal direction of the shanks, it is also possible to provide several slot-shaped holes 19 at different positions of the periphery of each guide sleeve 22. These holes 19 the walls or axes of which may be equally inclined should then be slightly offset relative to each other in the axial direction of sleeve 22. Thus, if a secure locking action between guide sleeve 22 and shank 1 cannot as yet be attained when setscrew 17 is inserted through one inclined hole 19 and screwed into shank 1 and guide sleeve 22 is then turned until one end of the hole abuts against the setscrew, the latter may be unscrewed from the shank and withdrawn from this hole 19, whereupon guide sleeve 22 may be turned so that setscrew 17 may be inserted into another inclined hole 19 and screwed again into the same bore in shank 1. When guide sleeve 22 is then turned, the locking effect which could not be attained by means of the first inclined hole 19 will now be attained by the second inclined hole 19.

If the control sleeve 3 is made of a length as shown in the drawings so as to project toward the rear beyond the setscrew 17, the slot-shaped hole 19 is made accessible for the purpose of inserting the setscrew and turning the guide sleeve 22 to its locking position by providing the control sleeve 3 in a position substantially corresponding to the position of the slot-shaped hole 19 in guide sleeve 22 with a sufficiently large bore 18 or with an oblong hole similar to and at least as wide as the hole 19. If several slot-shaped holes 19 are provided in guide sleeve 22, the control sleeve 3 may either be turned so that its large bore 18 or a sufficiently wide oblong hole overlies the hole 19 or the control sleeve 3 may be provided with several bores or oblong holes in positions substantially corresponding to those of the holes 19 in guide sleeve 22.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In a quick-change chuck comprising a cylindrical shank having a tubular wall, a tool socket axially slidable within said shank and adapted to receive a tool, an adjusting nut adapted to be screwed upon the font end of said socket for shifting said socket in its axial direction relative to said shank, said nut having a crylindrical neck portion and a peripheral groove within said neck portion, a guide sleeve surrounding said shank and having on its front end an annular neck of a smaller diameter forming an inner shoulder adapted to abut against the front end of said shank, and having a plurality of transverse bores therein, a plurality of locking balls movable substantially radially within said transverse bores into and out of said peripheral groove, a spring-biased control sleeve surrounding and slidable axially along said guide sleeve for guiding the radial motion of said balls, said shank having a tapped bore and said guide sleeve having a hole substantially in alignment with said tapped bore when said shoulder on said guide sleeve abuts against the front end of said shank, and a setscrew inserted into said hole and screwed into said tapped bore for locking said guide sleeve to said shank, the improvement comprising means for ensuring the abutment of said shoulder on said guide sleeve against said shank so as to prevent movement therebetween consisting in providing said hole in the form of an elongated slot of a certain length extending in the peripheral direction of said guide sleeve and having a width substantially equal to the thickness of said setscrew and having a longitudinal axis slightly inclined relative to a plane extending vertically to the axis of said guide sleeve.

2. A quick-change chuck as defined in claim 1, wherein said guide sleeve is provided with at least two of said inclined slots at different parts of the periphery of said guide sleeve and slightly offset relative to each other in the longitudinal direction of said guide sleeve.

3. A quick-change chuck as defined in claim 1, wherein said control sleeve extends beyond the rear end of said guide sleeve and has at least one aperture therein having a sufficient size to permit said setscrew to be inserted through said aperture into and through said slot and to be screwed into said tapped bore in said shank and also to permit said guide sleeve to be turned about its axis relative to said setscrew so as to shift said guide sleeve in its longitudinal direction until its shoulder on said neck abuts tightly against said end surface of said shank.

4. A quick-change chuck as defied in claim 3, in which the inclination of said slot is so small that, when said guide sleeve has been turned so that said shoulder abuts tightly against said end surface of said shank, a self-locking friction occurs between said setscrew and one side wall of said slot.

* * * * *